(12) United States Patent
Tyczka et al.

(10) Patent No.: US 7,119,911 B2
(45) Date of Patent: Oct. 10, 2006

(54) MOIRÉ DEFLECTOMETER INCLUDING NON-MECHANICAL, TRANSPARENT, SPATIAL LIGHT MODULATORS FOR DEMONSTRATING TWO-AXIS RULINGS

(75) Inventors: Dale R. Tyczka, Collegeville, PA (US); John G. Lehman, Jr., King of Prussia, PA (US); Alvin B. Cabato, Plymouth Meeting, PA (US); Daniel Stern, Berwyn, PA (US)

(73) Assignee: LSA, Inc., Arlington, VA (US)

( * ) Notice: Subject to any disclaimer, the term of this patent is extended or adjusted under 35 U.S.C. 154(b) by 261 days.

(21) Appl. No.: 10/382,585

(22) Filed: Mar. 7, 2003

(65) Prior Publication Data
US 2004/0174539 A1 Sep. 9, 2004

(51) Int. Cl.
*G01B 11/24* (2006.01)

(52) U.S. Cl. .................... 356/603; 356/605

(58) Field of Classification Search ........ 356/601–613, 356/128; 250/559.39, 559, 22, 237 G
See application file for complete search history.

(56) References Cited

U.S. PATENT DOCUMENTS

| | | | | |
|---|---|---|---|---|
| 3,663,221 | A | * | 5/1972 | Higgins et al. ................ 430/7 |
| 3,890,035 | A | * | 6/1975 | Takeda ...................... 359/250 |
| 4,051,367 | A | * | 9/1977 | Sayce et al. ............ 250/237 G |
| 4,091,281 | A | * | 5/1978 | Willhelm et al. ....... 250/237 G |
| 4,459,027 | A | * | 7/1984 | Kafri et al. ................. 356/605 |
| 4,639,132 | A | * | 1/1987 | Glatt et al. ............... 356/124.5 |
| 4,810,895 | A | * | 3/1989 | Kafri et al. ............ 250/559.39 |
| 5,175,601 | A | * | 12/1992 | Fitts ........................... 356/604 |
| 6,709,113 | B1 | * | 3/2004 | Segler et al. ................. 353/69 |
| 2006/0001861 | A1 | * | 1/2006 | Wegmann ................... 356/124 |

* cited by examiner

*Primary Examiner*—Hoa Q. Pham
(74) *Attorney, Agent, or Firm*—Reed Smith LLP; Stanley P. Fisher, Esq.; Juan Carlos A. Marquez, Esq.

(57) ABSTRACT

A Moiré deflectometer includes at least three non-mechanical, transparent, spatial light modulators for demonstrating two sets of patterns on two parallel planes on two of the modulators thereby creating a Moiré fringe pattern and a method for using the same. More particularly, each of the spatial light modulators may be a liquid crystal display, an electrochromic device, a micromirror array, a microlouvre array, an electro-optic device, or a holographic device.

21 Claims, 10 Drawing Sheets

Moiré Deflectometry a) low-resolution, horizontal measurement
b) low-resolution, vertical measurement
c) high-resolution, vertical measurement
d) very-high-resolution, horizontal measurement a) infinite mode
b) finite mode direction of ruling motion

MOIRÉ DEFLECTOMETER INCLUDING NON-MECHANICAL, TRANSPARENT, SPATIAL LIGHT MODULATORS FOR DEMONSTRATING TWO-AXIS RULINGS

This invention was made with Government support under contracts F29601-99-C-0012 and F29601-98-C-0158 awarded by the United States Air Force. The Government has certain rights in the invention.

BACKGROUND OF THE INVENTION

1. Field of the Invention

The invention generally relates to a Moiré deflectometer comprising at least two non-mechanical, transparent, spatial light modulators for demonstrating two sets of microscopic parallel lines on two parallel planes on two of the modulators thereby creating a Moiré fringe pattern and a method for using the same. More particularly, each of the spatial light modulators may be a liquid crystal display, an electrochromic device, a micromirror array, a microlouvre array, an electro-optic device, or a holographic device.

2. Description of Related Arts

The use of the basic ruled pattern to aid in testing of optical components, such as mirrors, was conceived by the Italian Vasco Ronchi in 1923. He used a ruled grating pattern of fine parallel lines to test the deviation of a mirror from its correct figure. In his experiments, the ruled grating pattern was put in front of the eye after removing the eyepiece from a telescope to visually assess the mirror quality. This was done by pointing the telescope at a star and viewing the deviations of the ruling grids from a straight line.

Moiré deflectometry involves the use of multiple mechanically ruled, fixed-period Ronchi gratings composed of a reflective or absorptive material deposited on a transparent substrate in straight lines that are spaced at uniform distances from one another. Two of these rulings are placed in the optical path of a surface under test. The shadow of the first Ronchi ruling is superimposed on the shadow of the second Ronchi ruling to produce Moiré fringes, which contain information about the mechanical and optical figure of the surface under test. From the Moiré fringes, it is possible to calculate the slope at every point by computing the tangent of the deflection angle. The deviations along each fringe make it possible to obtain a map of the slopes over the entire reflective surface. Using this technique, the mapping of the slopes is one-dimensional. In order to determine the slopes in the other dimension, the rulings must be rotated 90° from their original position.

FIG. 1 and FIG. 2 illustrate the classical approach of a Moiré deflectometer design, as described in U.S. Pat. Nos. 4,459,027 and 4,810,895, which requires different arrangements for testing phase objects and reflective objects. A phase object is typically characterized as a transparent object that changes the phase of light as it passes through the object. Examples of phase objects are lenses, variation in the density of liquids, and thermal variations in the atmosphere. In the basic arrangement for testing phase objects as illustrated in FIG. 1, collimated beam passes through the phase object to be examined and then traverses the set of gratings G1 and G2 of identical pitch, p, separated by a distance $\Delta$. Each grating is a piece in which numerous microscopic parallel lines are scribed. A Moiré pattern is formed by overlapping the shadow of the first grating with the shadow of the second grating on a mat screen attached to the grating G2. To analyze a reflective surface, such as a mirror, the arrangement is modified as illustrated in FIG. 2 in which the collimated beam is first projected onto a specular surface at an angle $\theta$, and the reflected beam passes through the gratings G1, G2. The equations of the Ronchi rulings for G1 and G2 can be written as: $y+f_1(x, y)=n\,p$ and $y+f_2(x, y)=m\,p$ where p is the pitch of the lines and n=1, 2, 3 . . . and m=1, 2, 3 . . . . When the difference between the two distorted gratings are superimposed to form a Moiré pattern and the substitution l=m−n is made, the result is: $f_1(x, y)-f_2(x, y)=l\,p$. The arrangement suffers from an inherent distortion $l \times \cos\theta$ in one axis. Other interfering effects, such as shadowing, might occur at higher angles.

The arrangement was further developed in U.S. Pat. No. 4,810,895, as shown on FIG. 3 and FIG. 4. The basic arrangement for measuring a phase object is shown in FIG. 3 and comprises a point source light, which produces a diverging beam of light. The diverging beam of light passes through a beam splitter and is directed to an optical system, which includes an objective lens L1, the phase object and a mirror. The light from the diverging beam is collimated by lens L1, passes through the phase object and reflects off of the mirror and back through the phase object. The light returns to the beamsplitter and is directed to a second objective lens L2, where it is collimated and traverses the set of gratings G1 and G2. A Moiré pattern is formed by the overlap of the shadows of the first grating with the second grating and is viewed on a mat screen. By analogy with the discussion regarding U.S. Pat. No. 4,459,027, the arrangement shown in FIG. 3 can be modified as shown in FIG. 4 to measure specular objects, such as curved mirrors by replacing the flat mirror and objective lens L1 with a test mirror. In FIG. 4, a point source of light, such as a laser, produces a diverging beam of light, which, after passing through a beam splitter is directed to the optical system as the one in FIG. 3 that retraces the light in the form of a converging beam from the examined object back towards the point source. The major difference is that FIG. 4 does not contain the large objective lens L1 shown in FIG. 3. In FIG. 4, the curved specular surface provides the same function of the objective lens L1 in FIG. 3.

An article published in 1979 by O. Kafri, "Tunable moiré grating for optical mapping," Opt. Lett. 4, 314–316, provides methods to change the instrument resolution by changing the spacing of the rulings and their pitch. The article suggests that mechanical linear or rotary motions of the Ronchi rulings or replacement with rulings of a different pitch can change the resolution of the Moiré deflectometer. However, either of these methods can compromise the critical optical alignment of the Ronchi rulings with other instrument optics and adversely impact the accuracy of the measurements.

There is a need for eliminating the limitations with Moiré deflectometry caused by the fixed Ronchi gratings thereby providing Moiré deflectometry surface measurements over a large dynamic range from one meter to ten micrometer spacial period bandwidth without image re-registration, mechanical adjustment, or software alignment.

Rather than any mechanically ruled gratings, U.S. Pat. No. 6,392,754 uses a light grid of parallel lines produced by a light source and a physical grid by a matrix composed of a large number of LEDs. The light grid is projected on a curved surface, such as an auto windshield, and then captured in a camera to be compared with a stored grid so as to determine the surface conditions. However, the projected grid does not contain information that can be related to a quantitative description of the surface contour. Further, the comparison requires a careful alignment between the captured grid and the stored grid.

The article by Sansoni et al, "A Novel Adaptive System for 3D Optical Profilometry Using a Liquid Crystal Light Projector," (IEEE Transactions on Instrumentation and Measurement, VOL. 43, No. 4, August 1994) provides a 3-D optical whole-field profilometer based on adaptive projection of one Ronchi grid by means of a Liquid Crystal Display (LCD) unit for industrial dimensional analysis, such as 3-D contouring and gauging of large-surface car parts, or fast dimensional analysis of objects in relation to recognition of targets by robots. The profilometer requires a well-defined geometric pattern between the entrance and exit pupils of the projection and imaging optics, and the pupil profile of the object is evaluated with respect to a well-defined reference surface. Demodulation is applied to the image of the grating deformed by the reference plane to obtain the reference phase map. Such a reference phase map must be acquired every time the profilometer is set up or calibrated. In addition, to change the profilometer sensitivity, the pitch of the LCD Ronchi ruling must be changed. The LCD projector can generate a coarse grid and a fine grid to increase resolution. The grating is varied in contrast and in period to adapt to the shape of the object under measurement.

There is a need for applying a light grid in Moiré deflectometry to define the surface contour of the object without a reference grid, a set of reference fringes, or a known geometric relationship between the instrument and the object. There is also a need to adjust the resolution of a Moiré deflectometer without mechanically changing the pitch of the lines of a ruling or moving the physical position of a ruling.

The article by Takacs et al, —"Surface Topography Measurements Over One Meter to TenMicrometer Spacial Period Bandwidth," SPIE vol. 1164, describes a method for measuring the surface contour of an object in the direction along the surface, rather than normal to the surface.

The article by O. Kafri and A. Livnat, "Reflective surface analysis using Moiré deflectometry," Appl. Opt 20, 3098–3100, 1981, describes using Moiré deflectometry to measure ray deflections from reflective surfaces. The article suggests that the sensitivity can be changed by varying the spacing between gratings but does not provide a method for doing so. Moreover, the article describes that the stability requirements are limited by the sensitivity of the measurement, which can be compromised by simply changing the location of the gratings through mechanical means.

SUMMARY OF THE INVENTION

It is an object of the present invention to provide non-mechanical generation and variation of Ronchi patterns that have variable rulings pitches, orientations and positions over a large dynamic range without disturbing the mechanical, and thus optical, alignment of the system such that there is no need for image re-registration, mechanical adjustment, or software alignment.

It is another object of the present invention to provide a ruling pattern that eliminates the need for a second Ronchi pattern rotated 90° from a first Ronchi pattern.

Other objects and advantages of the present invention may be seen from the following detailed description:

This invention utilizes a transparent liquid crystal display (LCD) to generate the grating patterns. The LCDs allow the generation of Ronchi patterns that can be varied in pitch and angular orientation about the optical axis of the instrument. The LCDs allow the Ronchi rulings to be generated at a 90° orientation without mechanical rotation of the Ronchi ruling. The LCDs also allow for the generation of a checkerboard pattern. The checkerboard Moiré fringes provide a 2-D field solution that eliminates the need for the second 90° rotation of the Ronchi rulings.

Since the lines are not fixed gratings and are generated by the LCD, the pitch of the lines can be varied. To increase the dynamic range of measurement, multiple LCDs can be placed at different distances and individual LCD pairs can be turned on to provide different instrument resolutions. The end result is that the ability to make a determination of the contour of a surface over a wide variety of depths is greatly enhanced.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 5(a) is an illustration of the basic arrangement; FIG. 5(b) is an illustration of the Moiré fringe pattern.

FIG. 6(a) is an illustration of the deflectometer in FIG. 5 with a distorted ray; FIG. 6(b) is an illustration of a deflectogram due to ray misdirection.

DETAILED DESCRIPTION OF THE PREFERRED EMBODIMENTS

In order to more clearly and concisely describe the subject matter of the claims, the following definitions are intended to provide guidance as to the meanings of specific terms used in the following written description. Also it is to be understood that the phraseology or terminology employed herein is for the purpose of description and not of limitation. As used herein:

"Grating": A framework or latticework having an even arrangement of rods, or any other long narrow objects with interstices between them, used to disperse light or other radiation by interference between wave trains from the interstices.

"Ruling": One of the straight lines sweeping out a ruled surface. The rulings on a ruled surface are asymptotic curves.

"Ruled Surface": A surface which can be swept out by a moving a line in space and therefore has a parameterization of the form x(u, v)=b (u)+vδ(u), where b is called the ruled surface directrix (also called the base curve) and δ is the director curve. The straight lines themselves are called rulings. Examples of ruled surfaces include the elliptic hyperboloid of one sheet (a doubly ruled surface), the hyperbolic paraboloid (a doubly ruled surface), Plücker's conoid, and the Möbius strip.

"Moiré deflectometry:" A method of nondestructive testing that determines the ray deflection and the modulation transfer function of an optical system. Two gratings of equal pitch are separated, and the rear grating is superimposed upon the shadow cast by the front grating, forming a Moiré fringe pattern.

"Moiré Pattern": A pattern developed from interference or light blocking, when gratings, screens or regularly spaced patterns are superimposed on one another.

Figure 5:
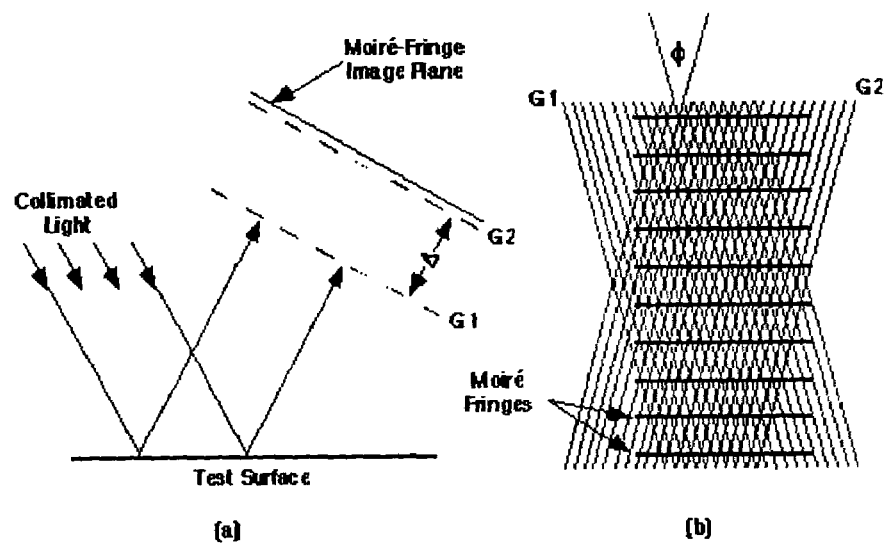
FIG. 5 is an illustration of the light path for a Moiré deflectometer of the first embodiment according to the invention.

The Moiré deflectometer according to the invention applies non-mechanical Ronchi ruling frequency and orientation changes. Each non-mechanical Ronchi grating is provided via a Liquid Crystal Display (LCD). The basic layout of the optical system is shown on FIG. 5. A comparison of FIG. 5 with the prior art shown in FIGS. 1–4 portrays the significant substitution of fixed-ruled grating with variable LCD gratings. With the use of variable Ronchi rulings, pitches/patterns generated on the surface of the LCDs can be changed without physically moving or rotating any gratings or aligning any resulting optics movements. Accordingly, Moiré deflectometric measurements can be made over a large dynamic range without image re-registration, mechanical adjustment, or software alignment.

A schematic of a basic reflective Moiré deflectometer according to the invention is shown in FIG. 5(a). As indicated in FIG. 5(a), the deflectometer consists of two liquid crystal display rulings, G1 and G2, separated by a distance Δ, with the ruling G1 rotated by a small angle θ relative to G2 as shown in FIG. 5(b). Each ruling is a transparent material (e.g., glass) with evenly spaced opaque lines (e.g., 40 lines/mm) on one surface. This spacing is referred to as the pitch of the ruling and is denoted by the letter p'. Through the use of tunable (i.e., variable-pitch) liquid crystal display gratings, the invention allows multiple measurements of various resolutions without changing the physical body of the gratings.

FIG. 5(b) shows a collimated beam falling on the test surface. After the beam is reflected off the surface, it passes through the first liquid crystal display ruling G1 and projects the shadow of G1 onto the second liquid crystal display ruling G2, which has the same pitch as G1. This arrangement produces a Moiré pattern directly behind the liquid crystal display ruling G2 as shown in FIG. 5(b). When the reflective surface is flat, the Moiré pattern consists of straight lines with a pitch, p', given by:

$$p' = \frac{p}{2\sin(\phi/2)} \quad (1)$$

Figure 6:
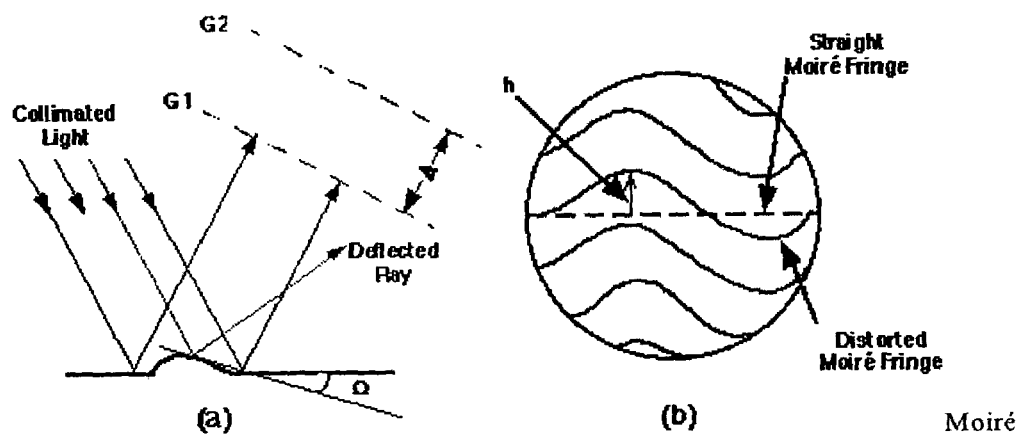
FIG. 6 is an illustration of the light path for a Moiré deflectometer when the surface is deformed.

If the surface is distorted, the reflected rays will not be parallel. In FIG. 6(a), one of the collimated rays strikes the distorted surface and is reflected in a direction different from the rest of the rays. Thus, when the first liquid crystal display ruling G1 is projected on to the second liquid crystal display ruling G2, the resulting Moiré pattern is distorted. This pattern, which is referred to as the deflectogram, contains the information on the directions of the rays of the beam. If the straight Moiré fringe deviates by an amount h (known as the fringe shift) at any location along the fringe, the deflection angle (Ω) at that point on the reflective surface is given by equation (2) as shown in FIG. 6(b).

$$\Omega = \frac{h\sin(\phi/2)}{\Delta} \quad (2)$$

The slope at every point can be calculated according to the equation (2) by computing the tangent of the deflection angle φ. Therefore, a map of the slopes over the entire reflective surface can be obtained by measuring the deviations (h) along each fringe in the deflectogram. However, the mapping of the slopes is only one-dimensional. That is, slopes are only obtained for the direction that is parallel to the fringes. In order to determine the slopes in the other dimension, the liquid-crystal display ruling pattern is rotated 90° from its original position. In performing such rotation, a contour map of the slopes for the object under test is obtained. Finally, since the slopes are the derivatives of the heights at each point, the surface topography is obtained by performing numerical integration of the slope function.

One of the main advantages of Moiré deflectometry is that the spatial sensitivity can be tuned over several orders of magnitude. For a telescopic deflectometer, the spatial sensitivity (Δf) is given by:

$$\Delta f = \frac{qF^2 p}{2aMd} \quad (3)$$

where, q is the fringe shift, F is the focal length of the system, p is the pitch of the liquid crystal display rulings, a is the diameter of the aperture, M is the magnification of the telescope, and d is the distance between the two liquid crystal display rulings. Thus, the spatial sensitivity of a Moiré deflectometer is tuned over several orders of magnitude by varying either the pitch of the ruling or the distance between the rulings. Experimental results have shown that heights as large as 2 cm described in O. Kafri and A. Livnat, "Tunable moiré grating for optical mapping," Opt. Lett. 4, 314–316 (1979) and as small as 2 μm described in D. Yogev, et al., "Study of the thickness of liquid layers by moiré deflectometry," Opt. Lett. 13, 934–936 (1988) can been measured with Moiré deflectometry. Equation 3 is applicable when the size of the deviations reaches the diffraction limit ($\Delta f_{d1}$) of the deflectometer:

$$\Delta f_{dl} = \left(\frac{F}{a}\right)^2 \lambda \quad (4)$$

Where, $\lambda$ is the selected wavelength of light. The angular sensitivity can also be tuned over several orders of magnitude. For a telescopic deflectometer, the angular sensitivity ($\Delta\phi$) is given by:

$$\Delta\phi = \frac{p}{2\pi Md} \quad (5)$$

Therefore, the angular sensitivity of a Moiré deflectometer can be tuned by varying either the pitch of the rulings or the distance between the liquid crystal display rulings. The minimum angular sensitivity ($\Delta\phi_{min}$) of the deflectometer is given by:

$$\Delta\phi_{min} = \frac{\lambda}{\pi^2 a} \quad (6)$$

Moiré deflectometry has other advantages when compared to interferometers and pro-filometers. These include immunity to shock and vibration, speed of measurement, and the ability to provide real-time mapping of the object under test.

Figure 14:
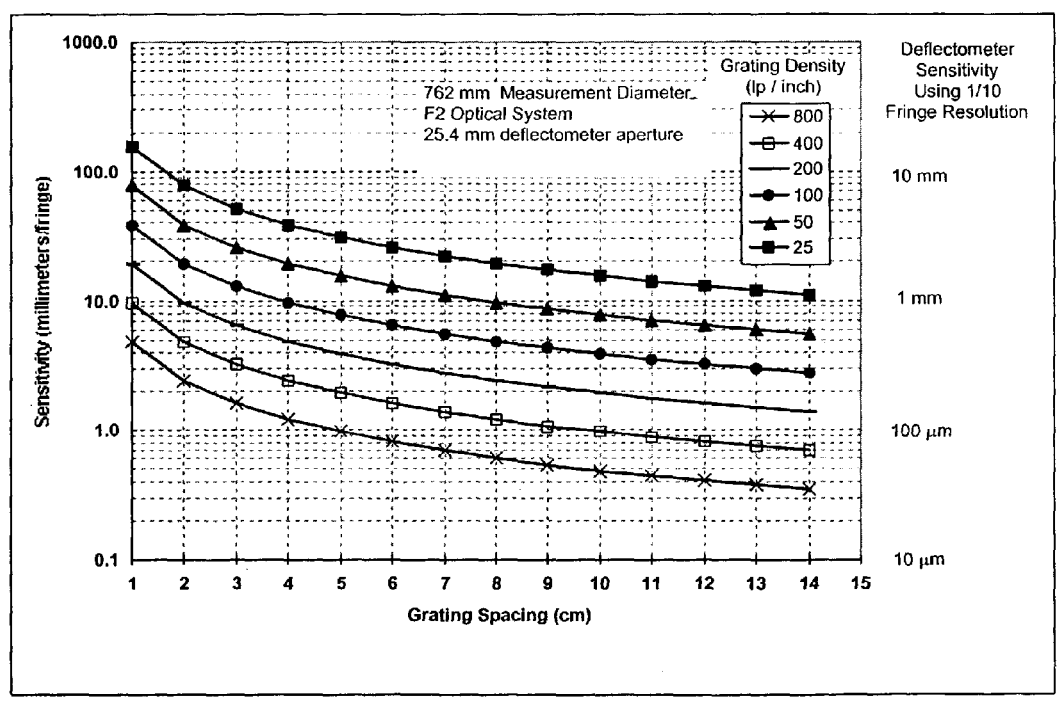
FIG. 14 is an illustration of the deflectometer sensitivity as a function of ruling pitch and spacing for a mirror diameter of 762 mm and an f/2 optical system. Using three rulings with the second and third spaced 1-cm and 14 cm from the first, a measurement range of a 35-μm to 180-mm resolution can be achieved.

Equations 1 through 6 show that the sensitivity of a Moiré deflectometer can be tuned by varying the pitch of the liquid crystal display rulings, or the distance between the liquid crystal display rulings (or gratings). Analytical trade studies were conducted to determine the practical limits of tunability based on realizable ruling pitch densities, distances between rulings and mirror and deflectometer parameters. A system design model was used to trade system performance with component requirements, cost, complexity, scanning and deflectometer size. Initial trades concentrated on practical liquid crystal ruling pitch of 25 through 800 line pairs per inch and distances between rulings of up to 14 cm. The mirror optical properties were modeled on the characteristics of a 762 mm diameter. The reflective membrane mirror has a usable 762 mm optical diameter and an f-number of 2. FIG. 14 shows a graph of the sensitivity of a deflectometer that is designed to measure the surface of a reflective membrane mirror with a diameter of 762 mm. The fringe sensitivity represents the amount of error resolvable between fringes generated by the deflectometer without factoring in a specific detection system. This axis is used to determine the largest resolution achieved by the system. Ruling pitch (or grating density) of 25, 50, 100, 200, 400 and 800 lines pairs (lp) per inch were calculated and plotted at grating spacings from 1 to 14 cm. The axis on the right of the graph shows sensitivity based on a detection system that provides ¹⁄₁₀ fringe resolution accuracy, which is used to determine the finest resolution achieved by the system.

FIG. 14 shows that a single pair of liquid crystal display rulings for any ruling positions with any realizable liquid crystal ruling densities provide about 2 orders of magnitude of deflectometer resolution. For example, two rulings are spaced 4 cm apart to provide the largest resolution of about 35 mm when a grating density of 25 lp/inch is used and the finest is about 0.1 mm resolution for a grating density of 800 lp/inch and ¹⁄₁₀ fringe resolution accuracy. To extend the dynamic range of the instrument even further, we used two different ruling spacings to achieve an effective 4 orders of magnitude measurement capability. This could be accomplished by placing three liquid crystal rulings in a row at different spacings: two close together and the last separated from the first by a larger distance. Depending on the measurement resolution desired, the deflectometer would either turn on the first G1 and second G2 liquid crystal rulings or the first G1 and third liquid G3 crystal rulings. FIG. 14 shows that high deflectometer sensitivity can be achieved with a large ruling spacing and high ruling densities (14-cm spacing and 800 lp/inch yields a 35 μm resolution using a ¹⁄₁₀ fringe resolution accuracy), and coarse resolution can be achieved with closely spaced rulings and low ruling densities (1-cm spacing and 25 lp/inch yields an 180-mm resolution without using ¹⁄₁₀ fringe resolution accuracy).

Figure 7:
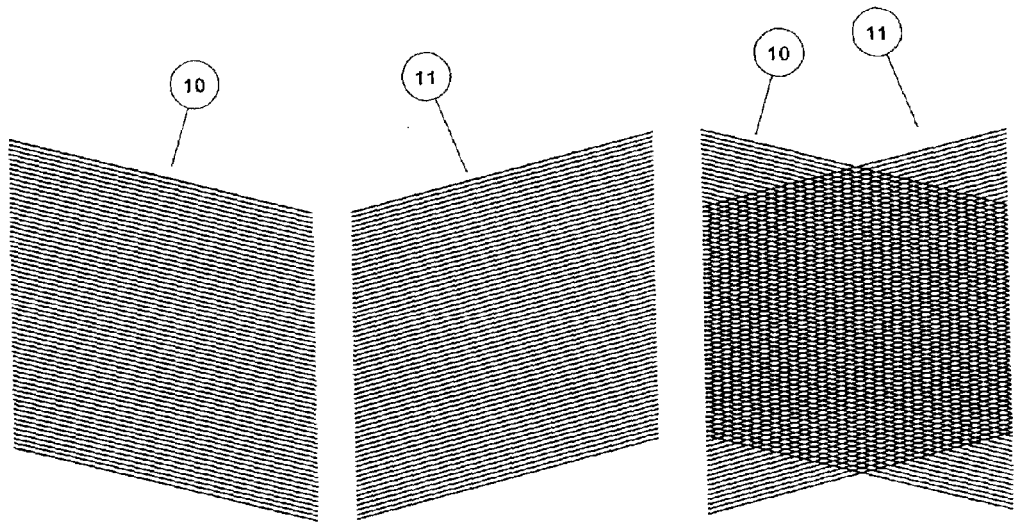
FIG. 7 is an illustration of the present state of the art generation of Moiré fringes from two Ronchi rulings.
Figure 8:
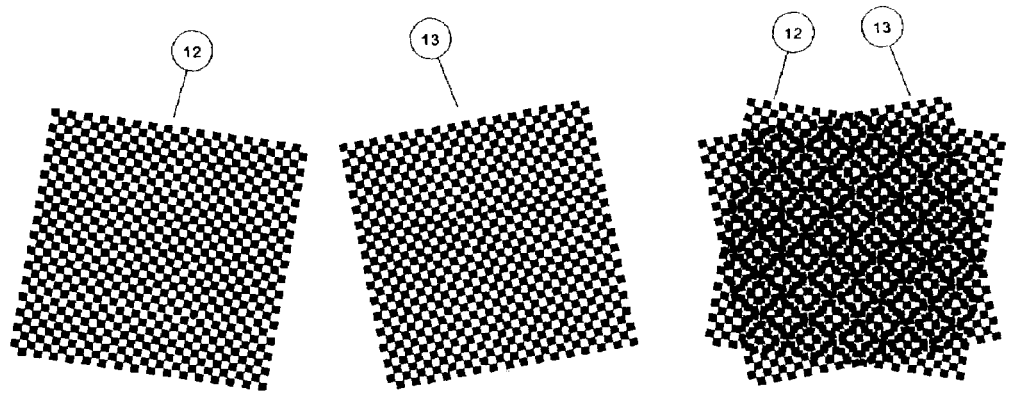
FIG. 8 is an illustration of the generation of checkerboard fringes from two checkerboard rulings.
Figure 9:
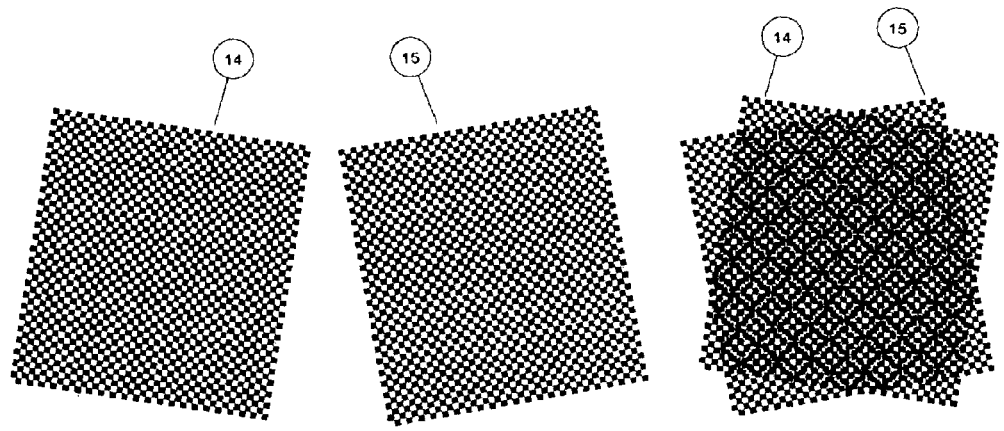
FIG. 9 is an illustration of the increase in the density of checkerboard fringes from two checkerboard rulings with a higher pitch.

The invention provides the Moiré pattern with two superimposed liquid crystal display Ronchi rulings 10 and 11 in FIG. 7. The deflectometer according to the invention not only replaces fixed Ronchi rulings with liquid crystal rulings, but also provides liquid crystal display rulings 12, 13 with a checkerboard pattern (FIG. 8) that eliminates the need for a second pattern at 90°. The liquid crystal display rulings 12, 13 with a checkerboard pattern of 30 squares per mm result in a checkerboard fringe pattern as shown on FIG. 8, which generates a two-dimensional map of the slopes over the entire reflective surface. To better determine the slope, the resolution between fringes can be improved by increasing the number of squares in a given area. A checkerboard pattern of 40 squares per mm is shown in FIG. 9. The checkerboard rulings 14 and 15 are superimposed to produce a finer checkerboard Moiré pattern. The concept of a two-dimensional map can be extended to other patterns or any number of patterns. For example, the two-dimensional map could be formed from a number of orthogonal parabolas (rather than a checkerboard pattern). The invention contemplates any pattern and rotation of any such a pattern including the combination of patterns generated from more than two LCD Ronchi rulings.

Figure 10:
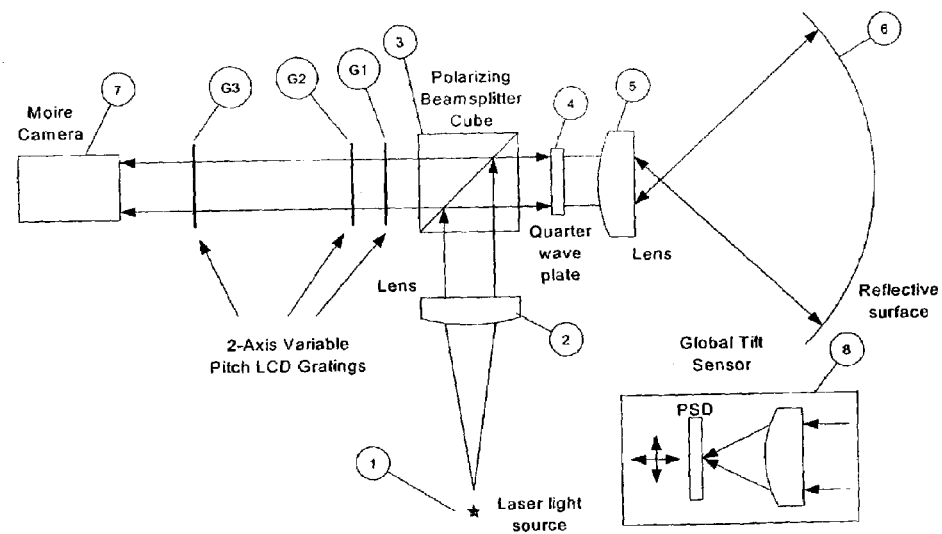
FIG. 10 an illustration of a Moiré deflectometer of the second embodiment according to the invention with a beam splitter, for a return path, and three liquid crystal displays for a reflective surface.

The deflectometer shown in FIG. 10 includes three liquid crystal display rulings G1, G2, and G3, a camera 7 for digitizing the Moiré fringes, a beamsplitter 3, a quarter wave plate 4, a plano-convex front-end lens 5, a mirror 6, a diode laser 1 and beam forming optics for incorporating the diode laser 1. The optical subsystem is designed to position the deflectometer at the mirror's radius of curvature. To accommodate large angular mirror tilts, the optical subsystem further includes a removable global tilt sensor 8. In this embodiment, the laser 1 generates the point of light. When the deflectometer is placed at the radius of curvature, the 630-nm wavelength fiber-coupled diode laser 1 is collimated by a plano-convex lens 2 and reflects off of the polarizing beamsplitter cube 3. The laser 1 is linear polarized and aligned such that the light reflects off the beamsplitter cube 3. The collimated beam is approximately one inch in diameter. The light transmits through the quarter wave plate 4, which changes the polarization of the light and then is brought to a focus at the mirror's ideal radius of curvature by the plano-convex front-end lens 5 of user-selectable focal length. The laser light expands and fills the mirror aperture and then reflects off of the mirror 6. Since the light emanated from the mirror's radius of curvature, the laser light is refocused to the front-end lens 5. The lens collimates the light and re-transmits it through the quarter wave plate 4, which again changes the beam polarization properties so that the light now has the correct polarization to transmit through the polarizing beamsplitter cube 3 and into the rest of the deflectometer. The rays then continue on through the beamsplitter cube 3 and then through LCD G1, G2 and G3. When LCD G1 and LCD G2 have fringe patterns shown in FIG. 12(b) while LCD G3 is turned off such that it is transparent, the Moiré fringes produced by G1 and G2 are shown on the right-hand side of FIG. 7. The Moiré fringes are then imaged onto a digital camera 7 mounted at the end of the bench. The optical subsystem effectively functions as a telescope. The mirror surface, with all its variations in the surface, is mapped by the LCD Ronchi rulings G1 and G2.

Figure 15:
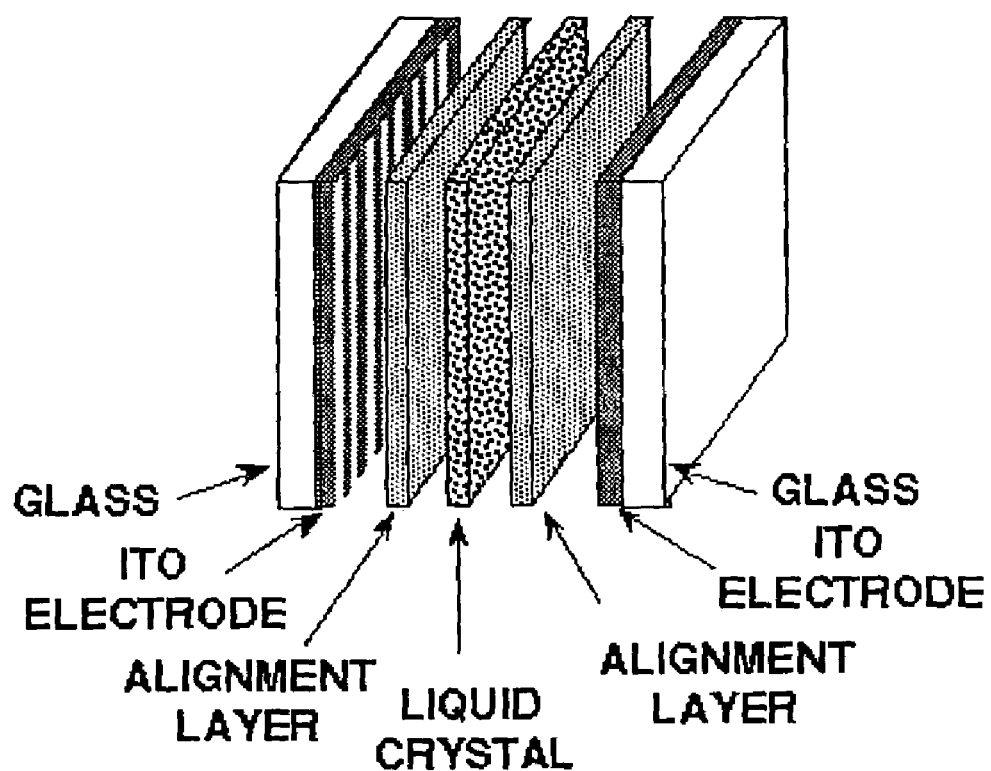
FIG. 15 is an illustration of a liquid crystal display device/ruling.

Liquid crystal display devices have been custom-designed for generating the variable pitch rulings. According to Equation 3, varying the pitch can change the spatial sensitivity of a Moiré deflectometer. Equation 5 indicates that adjusting the pitch can vary the spatial sensitivity. The invention changes the pitch of the ruling non-mechanically by using liquid crystal display rulings. In particular, such a custom-designed liquid crystal display device/ruling as shown in FIG. 15 are made of two flat plates of glass with a 4–25 μm layer made of liquid crystal display material, nematic liquid crystal EM Industries NP-4 or NP-5 for instance, sandwiched there between. Each of the plates of glass has a thin coating of 200 angstroms of a transparent electrode material, such as indium tin oxide (ITO). By patterning the electrode material on one of the substrates, a straight-line ruling is provided. An alignment layer of polyimide, for instance, of 200 angstroms thickness is placed over the transparent electrode material and then buffed to induce a uniform orientation of the liquid crystal material. By applying voltages to some of these ruling stripes the liquid crystal material is made to rotate its polarization and when the device is placed between crossed polarizers, passage of light through these stripes is blocked to create an amplitude ruling. By changing the number of electrode stripes to which are applied with a voltage, the pitch of the rulings is varied. An alternative approach for generating rulings is to use commercially-available black and white liquid crystal displays. One such liquid crystal display used in the system of FIG. 10 is the 640×480-pixel liquid crystal display, which is adapted from the nView Corporation's nSight® LCD projector. The 1280×1024 pixels, 1.8"—format liquid crystal display adapted from Sanyo® PLC-EF10NA display projector was also evaluated. The selection of COTS or custom devices would primarily depend on resolution requirements. Typically, custom devices can provide a higher resolution.

FIG. 10 further shows global tilt sensor 8 that can be added to measure even larger angular errors in mirror 6. The global tilt sensor could use a position-sensing detector (PSD), such as the one adapted by Duma Optronics Ltd. in its AlignMeter® system, which can be configured to directly read out the relative angular displacement of an incoming beam.

Figure 1:
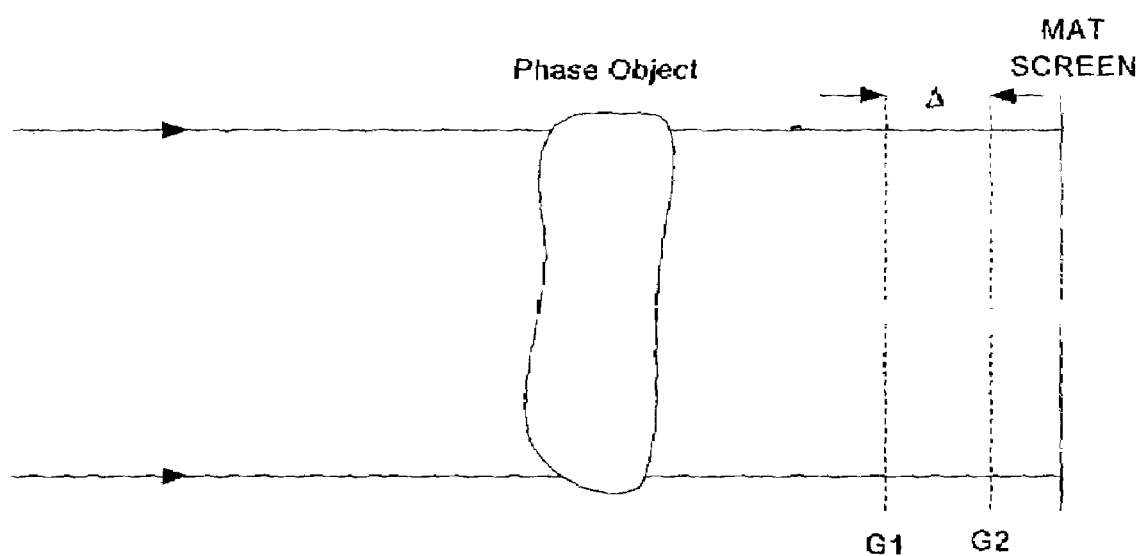
FIG. 1 is a prior art illustration of a classic Moiré deflectometer design for a phase object.
Figure 2:
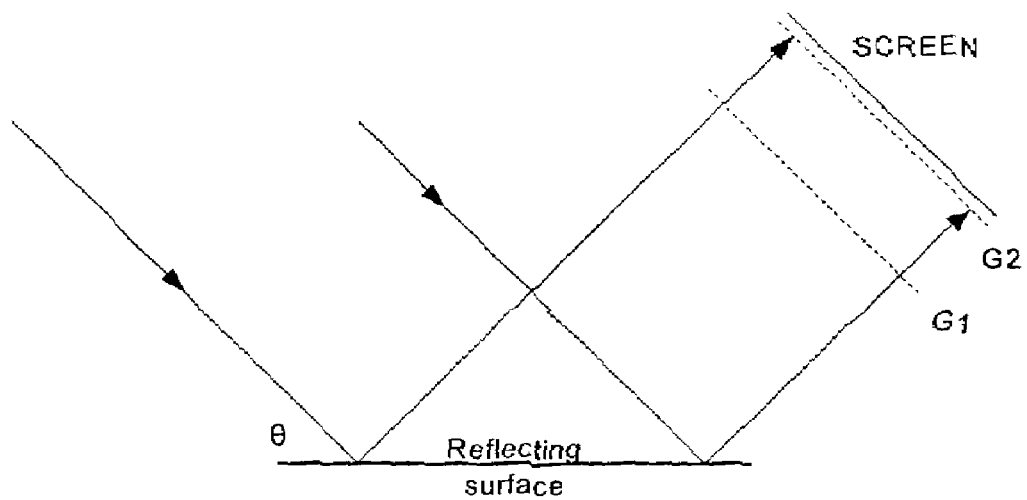
FIG. 2 is a prior art illustration of a classic Moiré deflectometer design for a reflective surface.
Figure 3:
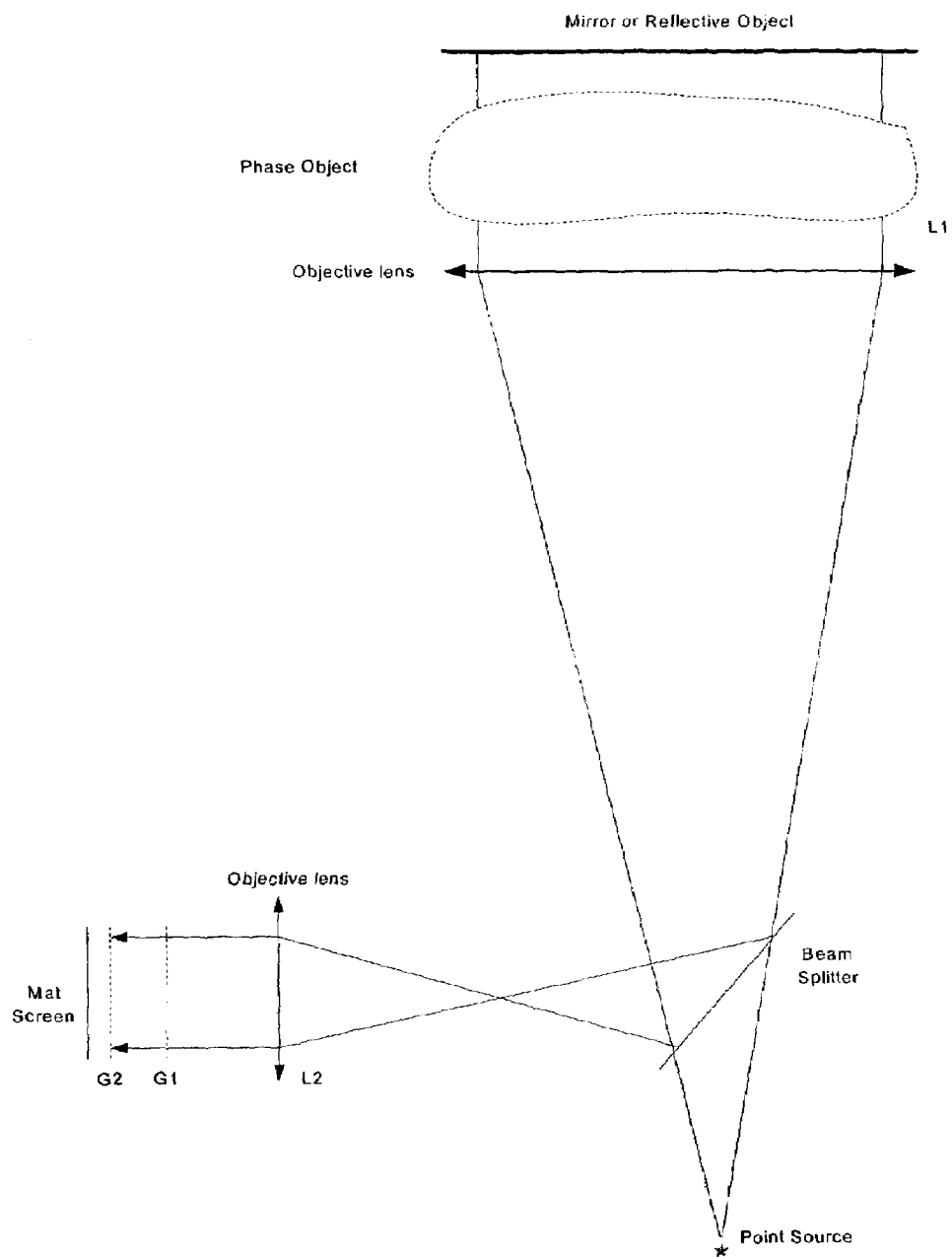
FIG. 3 is a prior art illustration of a Moiré deflectometer design with a beam splitter for a return path for a phase object.
Figure 4:
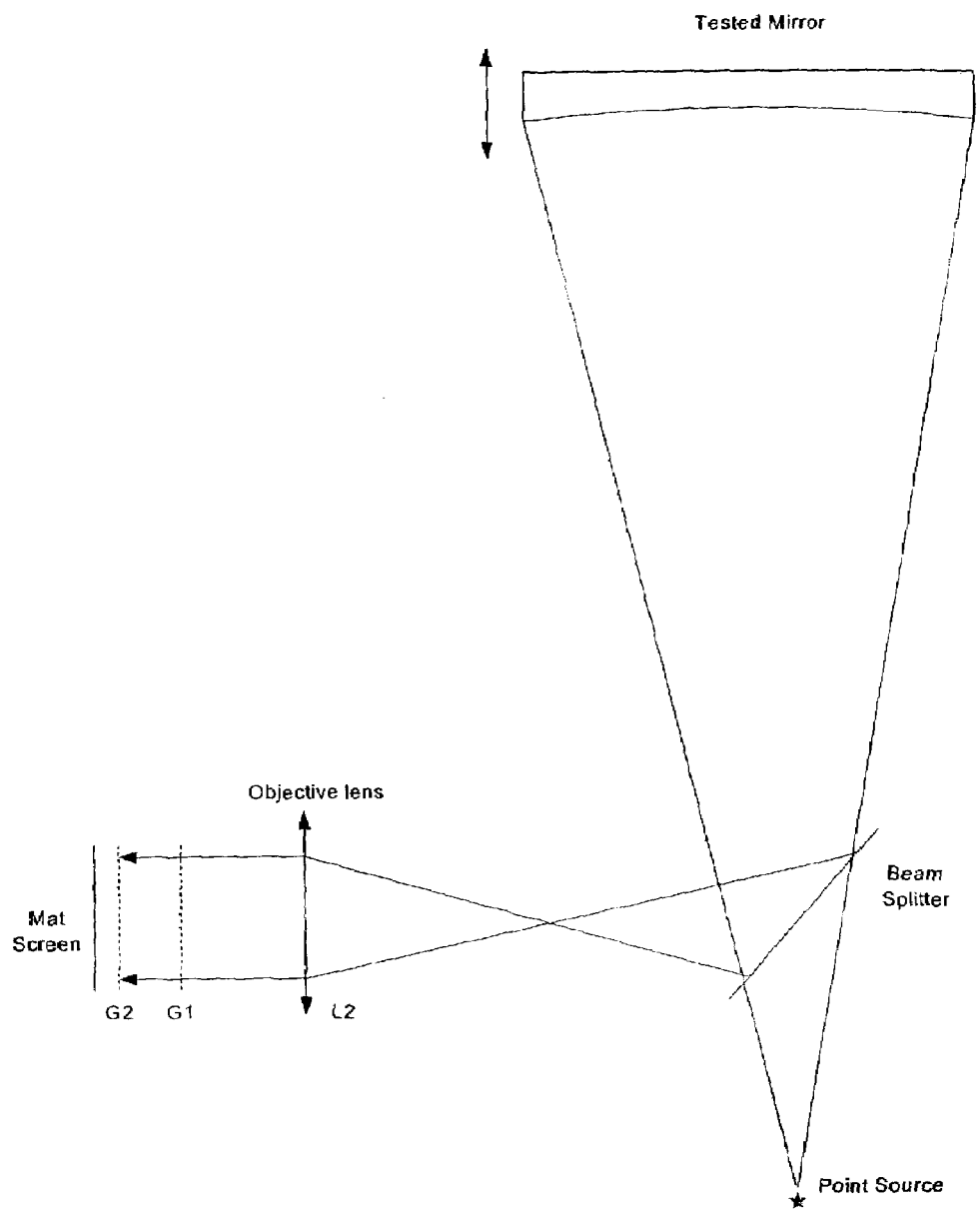
FIG. 4 is a prior art illustration of a Moiré deflectometer design with a beam splitter for a return path for a reflective surface.
Figure 11:
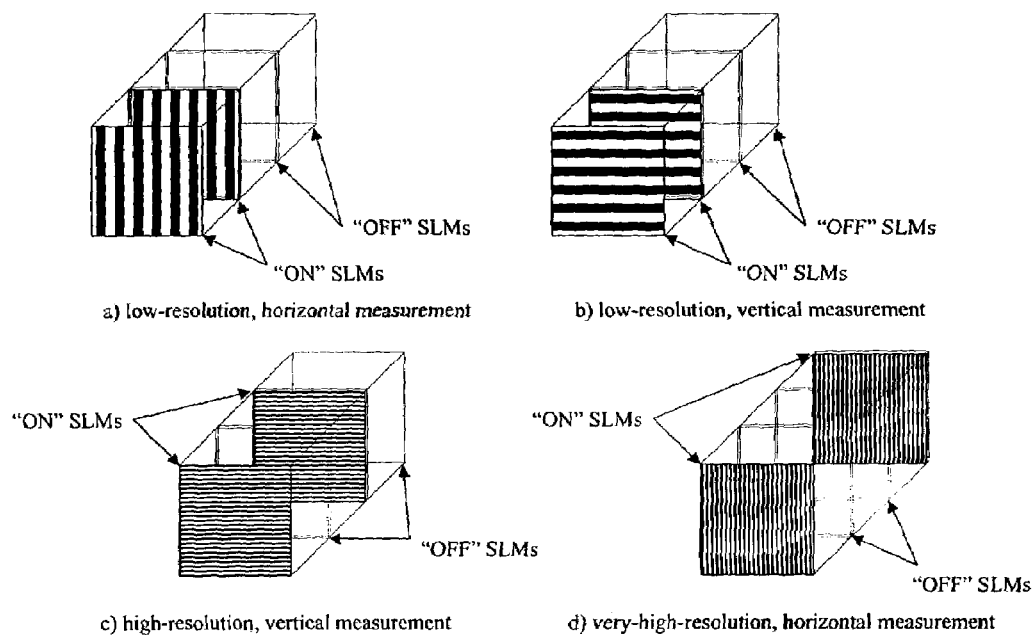
FIG. 11 is an illustration of a monolithic, multiple two-axis spatial light modulator in various states.
Figure 12:
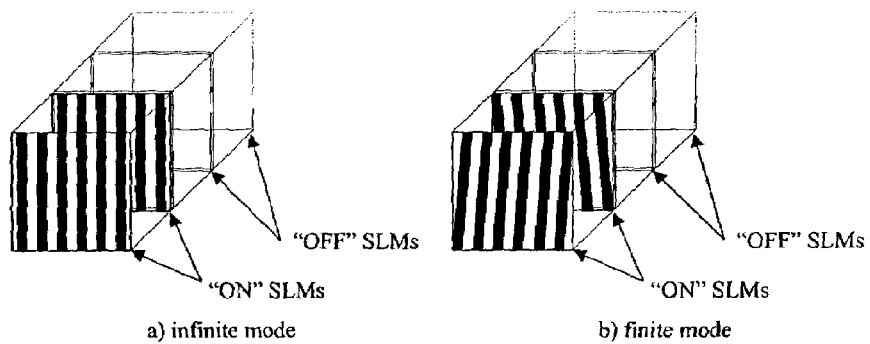
FIG. 12 is a comparison of Ronchi rulings oriented for infinite and finite modes of measurement.

The Moiré deflectometer according to the invention eliminates the need to move or replace the Ronchi rulings through the use of multiple two-axis spatial light modulators (SLM), which are capable of producing uniform or varying cyclic patterns, and can be used to demonstrate basic operation of the invention, such as the LCD rulings as described above. Each of the two or more SLMs is individually controllable, although the same Ronchi pattern is typically displayed on all SLMs. If an application calls for a wide dynamic range, more than two SLMs are utilized among which one or more are turned "off" (i.e., in its fully transparent state) with two remaining "on" for displaying appropriate patterns. In this manner, the distance between the "on" SLMs can be changed non-mechanically. The SLMs are preferably fabricated simultaneously, and the individual SLMs can be rigidly held with respect to each other using a mechanical mount on alternating sides of thick optical spacer substrates (such as a blocks of optical quality glass) to form a monolithic, solid-optic multi-SLM block. This is illustrated in FIG. 1. Various on-off states for SLMs are shown in FIG. 11 and FIG. 12. The LCD gratings have special properties. Each display consists of 640×480 pixels in black and white. The display is controllable through a VGA Display driver. The ruling patterns are displayed onto the LCDs. Many types of LCDs can be used, but some LCDs are not suitable for use in the instrument. For instance, some LCDs include microlens arrays, which defeat the transmission value of the LCD display and therefore light passing through the third grating G3 would not reach the black and white high-resolution digital camera 7.

The invention chooses the spacing between the spatial light modulators to minimize stray light and/or improve the signal-to-noise ratio. This is due to the pixelated nature of the SLM and the ability of each pixel to be turned on and off with high contrast. As shown in FIG. 11 and FIG. 12, the ruling pitch, orientation and position can be changed, without mechanical movement of any components. In order to maximize the signal-to-noise ratio of the Moiré fringe images, the distances between the rulings are typically held at positions commonly referred to as Talbot planes as discussed in "Automated phase sensing and control of an external Talbot cavity laser with phase-contrast imaging," Applied Optics, vol 33. These planes, which are dependent on ruling pitches, are located at distances that result in overlapping the diffraction orders of the first ruling with the opaque portions of the second ruling. Talbot planes are very effective at eliminating stray light induced by diffraction through the rulings. Although it is not fundamentally necessary, it is helpful to use these planes in determining spacer thickness.

When oriented in parallel with each other, pairs of Ronchi rulings enable a mode of measurement known as the infinite mode as shown in FIG. 12(a). The infinite mode, as described in "The Physics of Moire Metrology," by Oded Kafri and Ilana Glatt, as a mode of measurement is highly sensitive and is well suited to the measurement of small features, but the fringe features can sometimes be difficult to see if there is little variability in the surface under test. The finite mode can be employed to improve the fringe visibility and facilitate a more convenient measurement. In this case, the rulings are tilted with respect to each other as shown in FIG. 12(b). The invention is well suited to the finite mode of measurement because of its ability to generate different types of patterns. On the contrary, the conventional permanent Ronchi rulings would need to be mechanically rotated in order to perform measurements in the finite mode. In order to maintain the orientation of the Moiré fringes (horizontal in the case of FIG. 12(b) and vertical by extension), it is desirable to tilt the first ruling to one direction and tilt the second ruling in an equal amount to the opposite direction. Conventionally, this requires both rulings to be mechanically rotated thereby increasing even further the risk of mechanical or optical misalignment. The invention, however, permits the tilted Ronchi rulings to be generated without any physical motion thereby keeping constant the mechanical and optical alignment of the system.

Figure 13:
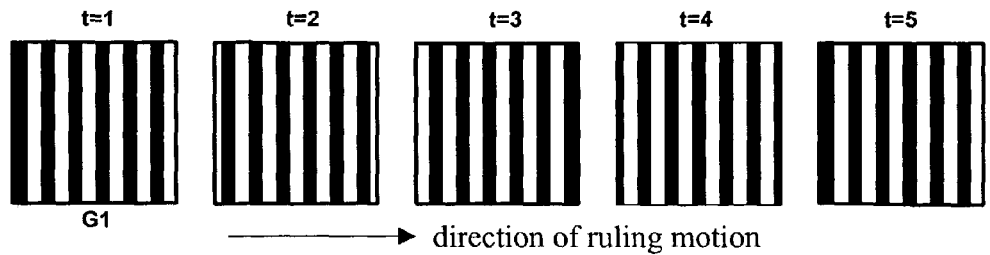
FIG. 13 is an illustration of non-mechanical phase stepping using a multiple two-axis spatial light modulator.

The ability to generate nearly any pattern is beneficial in another way, as well. In order to obtain information over an entire object, it is necessary to step the Moiré pattern over the entire surface of the object to fill in information that is obscured by the opaque lines of the Moiré pattern. The Moiré pattern can be made to cover the entire surface of the object by shifting one ruling with respect to the other ruling by a fraction of the ruling pitch interval. When the ruling has moved by an entire ruling pitch interval with respect to the other ruling, the Moiré pattern will retrace its pattern over the object. This technique of moving the Moiré pattern is known as phase stepping and is conventionally done by a mechanical operation in which the ruling is physically translated in the direction perpendicular to the ruled lines. This mechanical motion is also dispensed with by this invention by simply displaying the lines one pixel width over for each phase step. This is effective for ruled lines as narrow as the width of the individual pixels, although this only provides two steps. At just two pixel widths, this increases to a more useful four phase steps. An example of phase stepping is shown in FIG. 13, where a ruling G1 is shown at 5 separate time intervals during a phase stepping process. In the first time interval, t=1, the ruling is in a particular location. At time interval t=2, the ruling has been translated in the horizontal direction by one pixel resolution of the display device. At time interval t=3, the ruling has been translated in the horizontal direction by another single pixel resolution, resulting in a total translation of 2 pixels. In this example, the pattern is repeated by time interval t=5.

It should also be noted that, although the preferred embodiments are particularly well suited to liquid crystal devices, the invention is not limited to this configuration. In fact, any form of a spatial light modulator capable of providing a uniform or varying cyclic pattern thereon can be used to demonstrate basic operation of the invention. This includes, but is not limited to electrochromic devices, micromirror arrays, microlouvre arrays, electro-optic devices, holographic devices and generally any other device capable of controlling the transmission or reflection of light and the generation of patterns. It is also within the scope of the invention to use a fixed mask in one or more locations in place of the variable spatial light modulator.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents, which fall within the spirit and scope of the present invention as defined in the claims, be embraced thereby.

What is claimed is:

1. A resolution-variable Moiré deflectometer comprising:
    a light source;
    a beamsplitter;
    an image recorder aligned with the a beamsplitter to define an optical axis of said deflectometer;
    at least three non-mechanical, transparent, spatial light modulators placed along said optical axis of said deflectometer with gaps in-between,
    distance varying means which selectively turns on at least two of said spatial light modulators and turns off at least one of said spatial light modulators to demonstrate each of two sets of parallel lines on one corresponding plane therein at a variable distance so as to create a Moiré fringe pattern.

2. The Moiré deflectometer according to claim 1, wherein ruling pitches, orientations and positions of said sets of parallel lines are adjusted by controlling the spatial light modulators.

3. The Moiré deflectometer according to claim 1, wherein said corresponding planes are parallel.

4. The Moiré deflectometer according to claim 1, wherein said two sets of parallel lines are rotated relative to each other.

5. The Moiré deflectometer according to claim 1, wherein each of said spatial light modulators is one of a liquid crystal display, an electrochromic device, a micromirror array, a microlouvre array, an electro-optic device, or a holographic device.

6. The Moiré deflectometer according to claim 1, wherein each set of said parallel lines are straight lines or orthogonal parabolas.

7. The Moiré deflectometer according to claim 1, wherein said two sets of parallel lines are arranged perpendicular to form a checkerboard pattern.

8. The Moiré deflectometer according to claim 1, wherein a checkerboard pattern is demonstrated in each of the two selected spatial light modulators.

9. The Moiré deflectometer according to claim 1, wherein said spatial light modulators are positioned on Talbot planes.

10. The Moiré deflectometer according to claim 9, wherein each of the said spatial light modulators is held on a mount.

11. The Moiré deflectometer according to claim 1, wherein at least one of the two sets of parallel lines are shifted with time in a perpendicular direction by a fraction of a pitch interval when being demonstrated on a corresponding plane.

12. A method for measuring a surface contour or a phase-shifting character of an object, comprising:
    providing at least three non-mechanical, transparent, spatial light modulators placed along an optical axis;
    selectively demonstrating two sets of parallel lines in two of said spatial light modulators respectively on one corresponding plane therein thereby varying a distance between the planes demonstrating said two sets of parallel lines, said planes are parallel to each other;
    projecting light onto the object;
    guiding a reflected light reflected by a surface of the object or a mirror behind the object toward the planes;
    detecting a Moiré pattern behind said spatial light modulators; and
    comparing a pattern demonstrated on said spatial light modulators with the Moiré pattern to determine the surface contour or the phase-shifting character of the object.

13. The method according to claim 12, further comprising a step of adjusting ruling pitches, orientations and positions of said sets of parallel lines by controlling the spatial light modulators.

14. The method according to claim 12, further comprising a step of adjusting ruling pitches of said sets of parallel lines to adjust measurement resolution.

15. The method according to claim 12, further comprising a step of rotating at least one of said planes to demonstrate the two sets of parallel lines tilted relative to each other.

16. The method according to claim 12, wherein the demonstrating step involves selectively turning on the spatial light modulators to demonstrate said sets of parallel lines thereon so as to vary a distance between the planes.

17. The method according to claim 12, further comprising positioning some of said spatial light modulators demonstrating said sets of parallel lines on Talbot planes.

18. The method according to claim 12, further comprising a step of turning on some of said spatial light modulators which are positioned on Talbot planes so as to demonstrate said sets of parallel lines thereon.

19. The method according to claim 12, wherein the demonstrating step involves providing one and only one checkerboard pattern composed of two sets of parallel lines with each set being perpendicular to each other on two parallel planes.

20. The method according to claim 12, wherein the demonstrating step involves providing two checkerboard patterns each composed by two sets of parallel lines with each set being perpendicular to each other on a plane, and demonstrating the checkerboard patterns on two parallel planes respectively.

21. The method according to claim 12, wherein the demonstrating step involves shifting at least one of said sets of parallel lines with time in a perpendicular direction by a fraction of a pitch interval on a corresponding plane.

* * * * *